April 28, 1964      R. E. McCLEARY      3,130,993
BALL HEAD CONSTRUCTION FOR BALL AND SOCKET COUPLER
Filed March 21, 1960
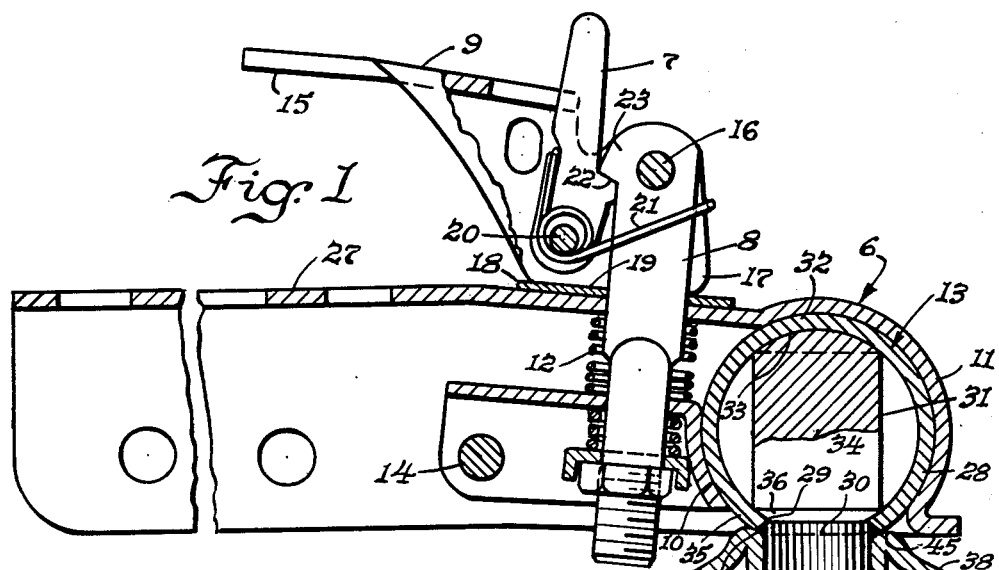
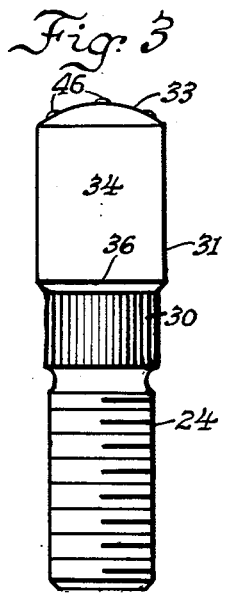
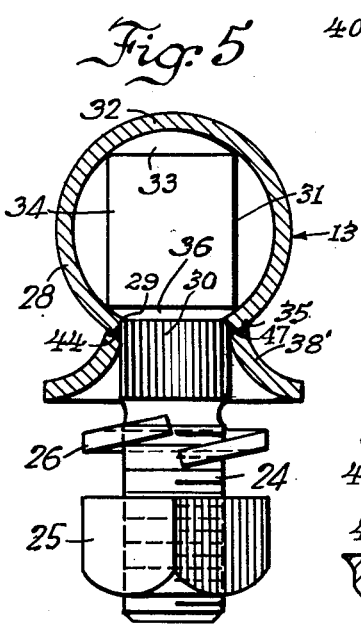
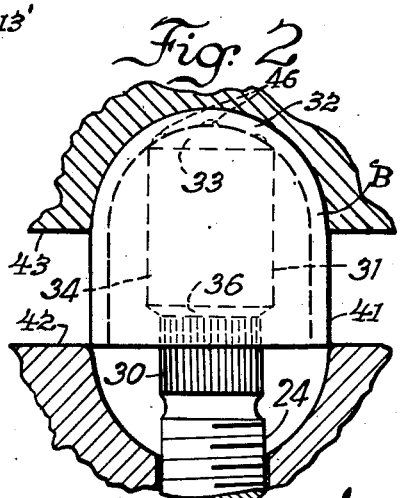
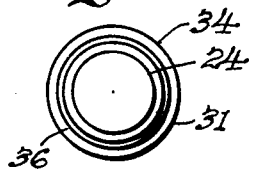
Inventor
Roy E. McCleary United States Patent Office 3,130,993
Patented Apr. 28, 1964

3,130,993
BALL HEAD CONSTRUCTION FOR BALL AND SOCKET COUPLER
Roy E. McCleary, Rockford, Ill., assignor to Atwood Vacuum Machine Company, Rockford, Ill., a corporation of Illinois
Filed Mar. 21, 1960, Ser. No. 16,258
6 Claims. (Cl. 287—90)

This invention relates to trailer couplings and is more particularly concerned with an improved stamped sheet metal ball head construction for greater economy and durability and also closer uniformity in quantity production.

A salient feature of the present ball head construction is the elimination of the hole in the top of the hollow spherical body which most, if not all, prior constructions of this kind required, with the attendant disadvantages, and, of nearly equal importance, is the elimination in the present construction of any need for any welding operations, which tend to increase cost of production and give rise to other objections.

In the ball head construction of my invention the upper half of the hollow ball is formed from a flat sheet in a deep draw, leaving a cylindrical lower skirt portion which in the assembling of the body on the enlarged cylindrical end of a center pin that has a spheroidally shaped upper end to match the curvature of the inside of the partially formed ball head body, is pressed inwardly spheroidally against the lower end of the enlarged upper end portion to complete the lower half of the hollow ball head body, after which a suitably cupped base ring is pressed onto the reduced shank portion into abutment with the bottom of the hollow ball head body to complete the assembly, longitudinal serrations on the shank next to the enlarged upper end portion helping to stake the base ring onto the shank and also to stake the hollow ball head body onto the shank to prevent turning of either of the two outer parts with respect to the inner part.

The invention is illustrated in the accompanying drawing in which—

FIG. 1 is a section through a trailer coupling of the ball and socket type, the ball of which is constructed in accordance with the present invention;

FIG. 2 is a side view of the partially formed hollow sheet metal ball head body produced in the first forming operation, which is a deep draw, the same being shown with the mounting pin between a holding die and a punch preliminary to the final forming operation;

FIGS. 3 and 4 are a side view and lower end view, respectively, of the center pin, and FIG. 5 is a view partly in section and partly in elevation of another ball head construction of a modified or alternative form similar to the one shown in FIG. 1.

Similar reference numerals are applied to corresponding parts throughout these views.

Referring first to FIGS. 1 to 4, the trailer coupling indicated generally by the reference numeral 6 in FIG. 1 is constructed along the lines of Nunn Patent No. 2,726,099, including a spring pressed latch 7 for the automatic locking of the rod 8 and lever 9 in ball retaining position, namely, with the movable jaw part 10 of the socket 11 raised against the action of the compression spring 12 to hold the ball indicated generally by the reference numeral 13 in coupled relationship to the socket 11. Jaw 10 is pivoted at 14 on a cross-pin to swing to and from ball retaining position. Lever 9, which has a handle portion 15 for manual operation, is pivotally connected by a cross-pin 16 with the upper end of the rod 8 and is arranged when swung in a counterclockwise direction about this pivot to force the rod 8 upwardly by cam action of the portion 17 of the lever on a hardened wear plate 18, and when the flat edges 19 of the lever 9 come into abutment with the wear plate the latch 7, which is pivoted on a cross-pin 20 in the lever 9 and is urged in a clockwise direction by means of a grasshopper spring 21, has its projection 22 arranged to snap into place under a projection 23 on the upper end of the rod 8 to provide the locking action. The ball disclosed in the Nunn patent is of the conventional solid construction, but the ball 13 herein disclosed is of improved hollow construction in accordance with the present invention. The threaded attaching shank 24 is arranged to be fastened by means of a nut 25 and lock washer 26 to a bracket suitably secured to the rear end of the towing vehicle, and the channel shaped rear end portion 27 of the socket member is arranged to be bolted in the usual way to the tongue of the trailer.

The ball 13, in accordance with my invention, comprises a spherically formed sheet metal ball head body 28 having only the one circular opening 29 in the bottom thereof where the ball head is staked onto the longitudinally serrated upper end portion 30 of the shank portion 24 of the center pin 31 on which the ball head body 28 is mounted in the novel manner shown, namely, by abutment at the top 32 with the spheroidally shaped upper end 33 of the enlarged cylindrical upper end portion 34 of the center pin, and with the perforated bottom portion 35 bearing against the spheroidally shaped annular shoulder 36 defined at the lower end of the enlarged upper end portion 34 of the center pin 31 and staked onto the longitudinally serrated upper end portion 30 of the reduced threaded shank portion 24. The serrated portion 30 is slightly larger in diameter than the threaded portion of the shank 24 so that the central collar portion 37 of a cupped base ring 38 will slip over the threaded portion of the shank 24 and be staked to the center pin 31 when pressed over the longitudinally serrated portion 30 into abutment with the perforated bottom portion 35 of the ball head body 28. Obviously, when the shank 24 is inserted through a hole 39 in a bracket 40 on the towing vehicle, and the nut 25 is tightened against the lock washer 26 and bracket 40, the base ring 38 is jammed tightly against the perforated bottom portion 35 of the ball head body 28, and both parts are forced into tight engagement with the annular shoulder 36, thereby eliminating any likelihood of the ball head body 28 working loose and getting bent out of shape and shifted to an off center relationship with respect to the center pin 31.

The ball head body 28 in its first forming operation, which is a deep draw, appears as shown in side elevation in FIG. 2 wherein the ball head body blank B is of semi-spherical shape, as indicated at 32, to provide the upper half of the ball head body 28, the cylindrical skirt portion 41 extending downwardly therefrom being pressed inwardly circumferentially by a punch 42 while the upper half 32 of the blank B is supported in a supporting die 43, and, of course, the center pin 31 is held in place inside the blank B in the same relationship to the upper half 32, as illustrated in FIG. 1, thereby forming the perforated lower half 35 of the ball head body 28 while at the same time staking it onto the longitudinal serrated portion 30 of the center pin. This leaves only the application of the base ring 38 onto the longitudinally serrated portion 30 of the center pin to complete the assembly.

In passing, attention is called in FIGS. 2 and 3 to the small semi-spherical projections 46 which may easily and at no added cost be provided on the spheroidal end 33 of the pin 31 in the upsetting operation, to be impressed into the inside of the ball head body 28, as indicated in FIG. 2, when the pin 31 grips the blank B in die 43 at the start of the final forming operation, whereby to help hold the ball head against turning on the pin. Also, a rubber gasket washer 47 surrounds the pin 31 and is compressed between the bottom of the ball head and the base ring 38 to seal the ball head against entry of liquid from the plating both in the subsequent plating operation, as well as to exclude moisture thereafter in service, as this could in time cause serious rusting of the ball head.

The assembly shown at 13' in FIG. 5 is the same as the assembly 13 of FIG. 1 and is made in the same way, but the base ring 38' has an annular edge portion 44 which in the staking of the base ring 38' on the longitudinally serrated portion 30 of the center pin 31 is pressed directly against the bottom 35 of the ball head around the opening 29, instead of the more or less rounded shoulder 45 abutting the ball head when base ring 38 with its central collar 37 is used. Rubber washer 47 in this assembly serves the same purpose, of course, as in the one previously described.

It is believed the foregoing description conveys a good understanding of the objects and advantages of my invention. The appended claims have been drawn to cover all legitimate modifications and adaptations.

I claim:

1. A hollow coupling ball structure comprising a unitary hollow sheet metal ball body having only one opening provided in the center of the bottom thereof defined by an inwardly directed annular bottom wall, a vertical mounting pin for said ball having a lower reduced shank portion and an enlarged upper end portion with an annular shoulder defined therebetween, said upper end portion having its upper extremity abutting the inner side of the upper half of said ball head body and having the annular shoulder at its lower extremity abutting the inner side of said annular bottom wall, whereby said pin supports said ball head body in centered relation to said pin at the top and bottom of said ball head body while the reduced lower end portion of said pin provides a means for attaching the structure to a support, and a base ring secured on the upper end portion of said reduced shank portion, in abutment with the inwardly directed bottom wall of said ball body annularly of the central opening therein serving to hold said bottom wall in abutment with the annular shoulder on the lower end of the enlarger upper end portion of said mounting pin to maintain said hollow ball body in accurately centered relationship to said pin, the reduced shank portion of the head mounting pin being serrated longitudinally, whereby the annular bottom wall of said ball head body which has a close fit on the reduced shank portion is keyed to the upper end portion of the reduced shank portion to prevent relative rotation between the ball head body and pin.

2. A hollow coupling ball structure comprising a unitary hollow sheet metal ball body having only one opening provided in the center of the bottom thereof defined by an inwardly directed annular bottom wall, and a vertical mounting pin for said ball having a lower reduced shank portion and an enlarged upper end portion with an annular shoulder defined therebetween, said upper end portion having its upper extremity abutting the inner side of the upper half of said ball head body and having the annular shoulder at its lower extremity abutting the inner side of said annular bottom wall, whereby said pin supports said ball head body in centered relation to said pin at the top and bottom of said ball head body while the reduced lower end portion of said pin provides a means for attaching the structure to a support, the upper end portion of said reduced shank portion having longitudinally extending serrations which serve by staking engagement in the edge portion of said annular bottom wall of said ball head body to hold the ball head body against turning relative to said pin.

3. A hollow coupling ball structure comprising a unitary hollow sheet metal ball body having only one opening provided in the center of the bottom thereof defined by an inwardly directed annular bottom wall, and a vertical mounting pin for said ball having a lower reduced shank portion and an enlarged upper end portion with an annular shoulder defined therebetween, said upper end portion having its upper extremity abutting the inner side of the upper half of said ball head body and having the annular shoulder at its lower extremity abutting the inner side of said annular bottom wall, whereby said pin supports said ball head body in centered relation to said pin at the top and bottom of said ball head body while the reduced lower end portion of said pin provides a means for attaching the structure to a support, the upper end portion of said reduced shank portion having longitudinally extending serrations which serve by staking engagement in the edge portion of said annular bottom wall of said ball head body to hold the ball head body against turning relative to said pin, and a base ring surrounding said shank portion in abutment with the bottom of said ball head body and held by staking engagement with said serrations against turning relative to said pin.

4. A hollow coupling ball structure as set forth in claim 3 wherein said base ring serves to clamp the edge portion of said annular bottom wall of said ball head body against the annular shoulder on said pin, said serrations also holding said ring against axial displacement from said clamping position, the structure including a gasket washer of compressible material surrounding the pin and compressed between the ball head and base ring to seal the bottom opening in the ball head.

5. A hollow coupling ball structure comprising a unitary hollow sheet metal ball body having only one opening provided in the center of the bottom thereof defined by an inwardly directed annular bottom wall, and a vertical mounting pin for said ball having a lower reduced shank portion and an enlarged upper end portion with an annular shoulder defined therebetween, said upper end portion having its upper extremity abutting the inner side of the upper half of said ball head body and having the annular shoulder at its lower extremity abutting the inner side of said annular bottom wall, whereby said pin supports said ball head body in centered relation to said pin at the top and bottom of said ball head body while the reduced lower end portion of said pin provides a means for attaching the structure to a support, the upper extremity of said enlarged upper end portion of said pin being spheroidal and struck on the radius of the inside of said ball head and having surface to surface abutment with the upper half of the ball head body, the spheroidal face of said pin having projections provided thereon which are received in depressions provided in the inside of the ball head body to hold the latter against turning relative to the pin.

6. A hollow coupling ball structure comprising a unitary hollow sheet metal ball body having only one opening provided in the center of the bottom thereof defined by an inwardly directed annular bottom wall, and a vertical mounting pin for said ball having a lower reduced shank portion and an enlarged upper end portion with an annular shoulder defined therebetween, said upper end portion having its upper extremity abutting the inner side of the upper half of said ball head body and having the annular shoulder at its lower extremity abutting the inner side of said annular bottom wall, whereby said pin supports said ball head body in centered relation to said pin at the top and bottom of said ball head body while the reduced lower end portion of said pin provides a means for attaching the structure to a support, the annular bottom wall of said ball head body being keyed to the upper end portion of the reduced shank portion to prevent relative rotation between the ball head body and pin, the structure including a base ring surrounding said shank portion in ball head body positioning abutment with the bottom of said ball head body and also keyed to said shank, the structure also including a gasket washer of compressible material surrounding the pin and compressed between the ball head and base ring to seal the bottom opening in the ball head.

(References on following page)

References Cited in the file of this patent

UNITED STATES PATENTS

| | | |
|---|---|---|
| 1,913,459 | Skillman et al. | June 13, 1933 |
| 2,170,980 | Thorp et al. | Aug. 29, 1939 |
| 2,392,063 | Reimann et al. | Jan. 1, 1946 |
| 2,462,138 | Spangenberg | Feb. 22, 1949 |
| 2,532,676 | Shaieb | Dec. 5, 1950 |
| 2,678,841 | Klages | May 18, 1954 |
| 2,768,848 | Mitchell | Oct. 30, 1956 |
| 2,787,048 | Heim | Apr. 2, 1957 |

FOREIGN PATENTS

| | | |
|---|---|---|
| 209,468 | Great Britain | Jan. 7, 1924 |